(12) United States Patent
Jang

(10) Patent No.: US 9,519,388 B2
(45) Date of Patent: Dec. 13, 2016

(54) TOUCH SENSOR HAVING MULTIPLE CODE MATRICES AND DRIVING METHOD THEREOF

(71) Applicant: SAMSUNG DISPLAY CO., LTD., Yongin, Gyeonggi-Do (KR)

(72) Inventor: Hyoung-Wook Jang, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 14/336,359

(22) Filed: Jul. 21, 2014

(65) Prior Publication Data

US 2015/0042606 A1    Feb. 12, 2015

(30) Foreign Application Priority Data

Aug. 6, 2013   (KR) ......................... 10-2013-0093005

(51) Int. Cl.
    G06F 3/045   (2006.01)
    G06F 3/044   (2006.01)
    G06F 3/041   (2006.01)

(52) U.S. Cl.
    CPC .............. *G06F 3/044* (2013.01); *G06F 3/0418* (2013.01)

(58) Field of Classification Search
    CPC ............................... G09G 3/044; G09G 3/0418
    USPC ........................................ 345/174; 178/18.06
    See application file for complete search history.

(56) References Cited

U.S. PATENT DOCUMENTS

| | | | |
|---|---|---|---|
| 7,812,827 B2 | 10/2010 | Hotelling et al. | |
| 8,248,382 B2 | 8/2012 | Muranaka | |
| 2007/0109274 A1* | 5/2007 | Reynolds | G06F 3/044 345/173 |
| 2010/0060591 A1* | 3/2010 | Yousefpor | G06F 3/044 345/173 |
| 2011/0037724 A1* | 2/2011 | Paulsen | G06F 3/044 345/174 |
| 2011/0061947 A1* | 3/2011 | Krah | G06F 3/0416 178/18.01 |
| 2011/0241651 A1* | 10/2011 | Oda | G06F 3/044 324/76.39 |
| 2012/0013546 A1* | 1/2012 | Westhues | G06F 3/044 345/173 |
| 2012/0056841 A1* | 3/2012 | Krenik | G06F 3/044 345/174 |
| 2012/0182259 A1 | 7/2012 | Han | |
| 2013/0063396 A1 | 3/2013 | Kim et al. | |
| 2014/0035874 A1* | 2/2014 | Iizuka | G06F 3/044 345/174 |
| 2014/0204053 A1* | 7/2014 | Crandall | G06F 3/044 345/174 |

(Continued)

FOREIGN PATENT DOCUMENTS

| | | |
|---|---|---|
| KR | 10-2012-0082207 A | 7/2012 |
| KR | 10-2013-0028629 A | 3/2013 |

*Primary Examiner* — Adam J Snyder
(74) *Attorney, Agent, or Firm* — Lee & Morse P.C.

(57) ABSTRACT

A touch sensor includes a controller to detect a touch on a screen. The controller includes a voltage analyzer and a calculator. The voltage analyzer measures an output voltage of a sensing electrode of a touch sensor. The calculator calculates a capacitance between the sensing electrode and a driving electrode. The calculator calculates the capacitance based on a voltage matrix and the output voltage for one or more time periods. The voltage matrix is based on a code matrix of a plurality of code matrices.

15 Claims, 3 Drawing Sheets

(56) References Cited

U.S. PATENT DOCUMENTS

2014/0240281 A1* 8/2014 Lee .................. G06F 3/044
  345/174

* cited by examiner

TOUCH SENSOR HAVING MULTIPLE CODE MATRICES AND DRIVING METHOD THEREOF

CROSS-REFERENCE TO RELATED APPLICATION

Korean Patent Application No. 10-2013-0093005, filed on Aug. 6, 2013, in the Korean Intellectual Property Office, and entitled, "Touch Sensor and Driving Method Thereof," is incorporated by reference herein in its entirety.

BACKGROUND

1. Field

One or more embodiments described herein relate to a touch sensor.

2. Description of the Related Art

A touch screen detects an input based on contact with an object or the finger of a user. Different touch sensors have been developed. Examples include capacitive touch sensors, resistive overlay touch sensors, and photosensitive touch sensors. Capacitive touch sensors detecting a touch location based on a change of capacitance. These sensors may detect multiple touches and demonstrate excellent accuracy.

SUMMARY

In accordance with one embodiment, a touch sensor includes a plurality of driving electrodes; a plurality of sensing electrodes crossing the driving electrodes; a touch driver to supply a touch driving signal to the driving electrodes; a voltage measuring unit to measure output voltages of the sensing electrodes for each time period; a memory to store a plurality of code matrices; and a capacitance calculating unit to select one of the code matrices in the memory, and to calculate capacitance between one of the sensing electrodes and one of the driving electrodes based on the selected one of the code matrices and a voltage matrix, wherein the voltage matrix includes the output voltages of one of the sensing electrodes for the time period.

The capacitance calculating unit may change the selected one of the code matrices to another one of the code matrices. The capacitance calculating unit may select one of the code matrices corresponding to noise in at least one of the sensing electrodes.

The touch sensor may include a noise detecting unit to detect the noise in at least one of the sensing electrodes. The capacitance calculating unit may select a code matrix corresponding to a frequency of the noise detected by the noise detecting unit.

The touch sensor may include a touch detecting unit to detect a touch position based on the capacitance calculated by the capacitance calculating unit. The capacitance calculating unit may calculate the capacitance between said one of the sensing electrodes and said one of the driving electrodes based on a product of an inverse matrix of the selected one of the code matrices and the voltage matrix. The driving electrodes and sensing electrodes may be transparent electrodes.

In accordance with another embodiment, a method of driving a touch sensor includes supplying a touch driving signal to a plurality of driving electrodes; measuring output voltages of a plurality of sensing electrodes for each time period; and selecting one of a plurality of code matrices and calculating capacitance between the sensing electrodes and the driving electrodes based on the selected one of the code matrices and a voltage matrix, wherein the voltage matrix includes the output voltages of the sensing electrodes for the time period.

Calculating the capacitance between the sensing and driving electrodes may include selecting one of the code matrices based on noise in at least one of the sensing electrodes. The method may include measuring noise in at least one of the sensing electrodes.

Calculating the capacitance between the sensing electrodes and driving electrodes may include selecting a code matrix corresponding to a frequency of the noise measured in at least one of the sensing electrodes. The method may include detecting a touch position based on the calculated capacitance.

Calculating the capacitance between the sensing and driving electrodes may include calculating the capacitance between the sensing electrodes and driving electrodes based on a product of an inverse matrix of the selected one of the code matrices and the voltage matrix. The driving electrodes and sensing electrodes may cross each other. The driving electrode and sensing electrode may be transparent electrodes.

In accordance with another embodiment, a controller includes a voltage analyzer to measure output voltages of a plurality of sensing electrodes of a touch sensor; and a calculator to calculate a capacitance between the sensing electrodes and a plurality of driving electrodes of the touch sensor, the calculator to calculate the capacitance based on a selected one of a plurality of code matrices and a voltage matrix, wherein the voltage matrix includes the output voltages of the sensing electrodes.

The controller may include a selector to select one of the code matrices based on noise in at least one of the sensing electrodes. The selected one of the code matrices may correspond to a frequency of the noise in at least one of the sensing electrodes. The controller may include a touch detector to detect a touch position based on the capacitance calculated by the calculator, wherein the touch position based on the capacitance corresponding to the selected one of the code matrices is more accurate than a touch position based on a capacitance calculated based on another one of the code matrices that does not correspond to the detected noise.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
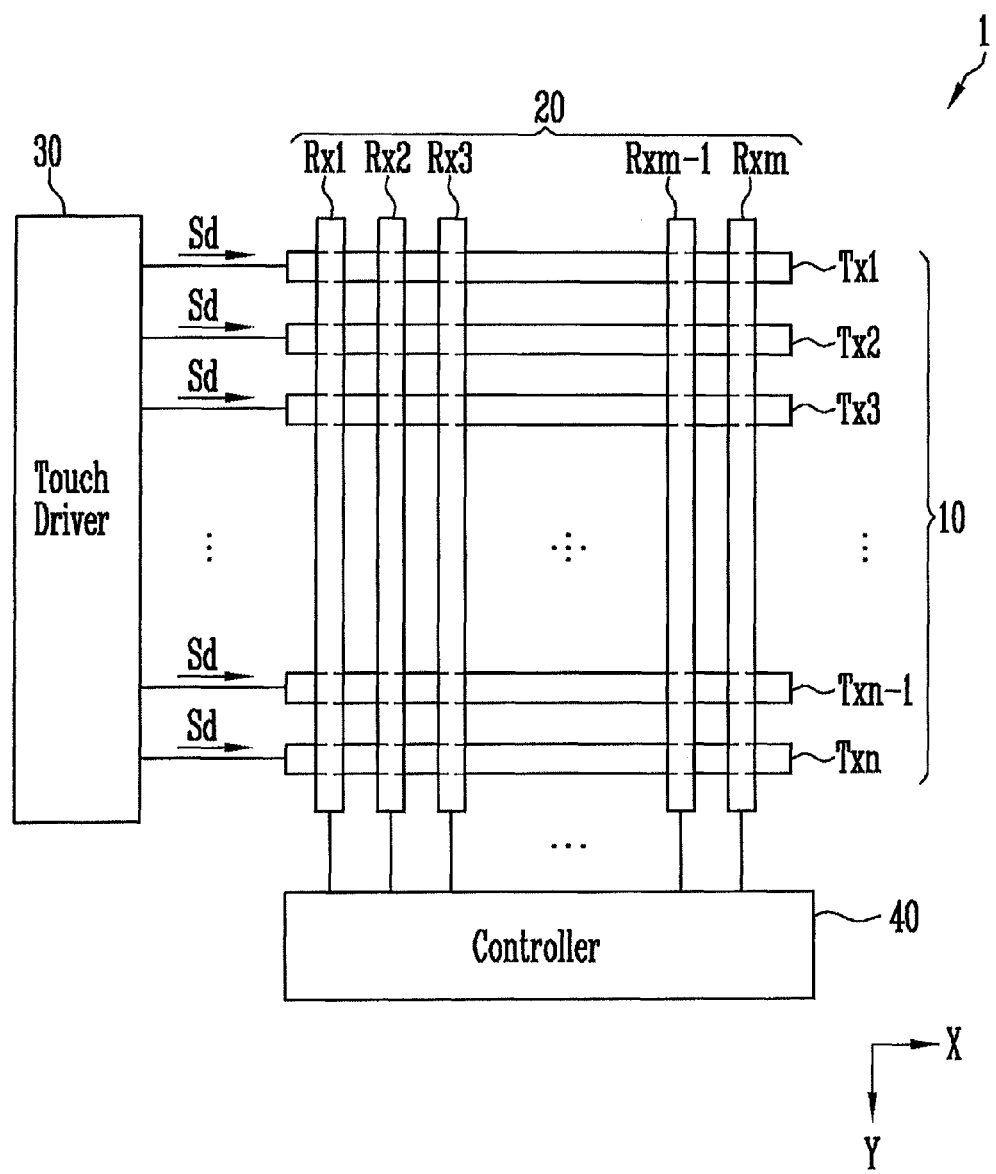
FIG. 1 illustrates an embodiment of a touch sensor.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawing figures, the dimensions of layers and regions may be exaggerated for clarity of illustration. Like reference numerals refer to like elements throughout.

FIG. 1 illustrates an embodiment of a touch sensor 1 which includes a plurality of driving electrodes 10, a plurality of sensing electrodes 20, a touch driver 30, and a controller 40. The driving electrodes 10 extend in a first (e.g., X-axis) direction and are arranged in a second (e.g., Y-axis) direction crossing the first direction. For example, first to n-th driving electrodes Tx1 to Txn may be included.

The sensing electrodes 20 are spaced from the driving electrodes 10, to allow the driving electrodes 10 and sensing electrodes 20 to operate as capacitive touch sensors. The sensing electrodes 20 intersect the driving electrodes 10. FIG. 1 illustrates that the driving electrodes 10 are below the sensing electrodes 20. In other embodiments, driving electrodes 10 may be above the sensing electrodes 20.

The sensing electrodes 20 extend in the second direction and are arranged along the first direction. For example, first to m-th sensing electrodes Rx1 to Rxm may be included.

Through this arrangement of driving electrodes 10 and sensing electrodes 20, mutual capacitance between the driving and sensing electrodes 10 and 20 may be formed at respective intersection (or crossing) points. Each intersection point may correspond to a sensing cell for detecting a touch.

The driving electrodes 10 and sensing electrodes 20 may be formed of a transparent conductive material. In other embodiments, the driving electrodes 10 and sensing electrodes 20 may be formed of an opaque conductive material. For example, driving electrodes 10 and sensing electrodes 20 may be formed of indium tin oxide (ITO), indium zinc oxide (IZO), graphene, carbon nanotube, or silver nanowires (AgNWs).

The touch driver 30 may supply a touch driving signal Sd to the driving electrodes 10. The touch driver 30 may progressively supply the touch driving signal Sd to the driving electrodes 10, or may simultaneously supply the touch driving signal Sd to at least two driving electrodes 10. Touch driver 30 may therefore be electrically coupled to the driving electrodes 10.

The controller 40 receives signals from sensing electrodes 20 and detects a touch position based on these signals. Controller 40 may therefore be electrically coupled to the sensing electrodes 20.

Figure 2:
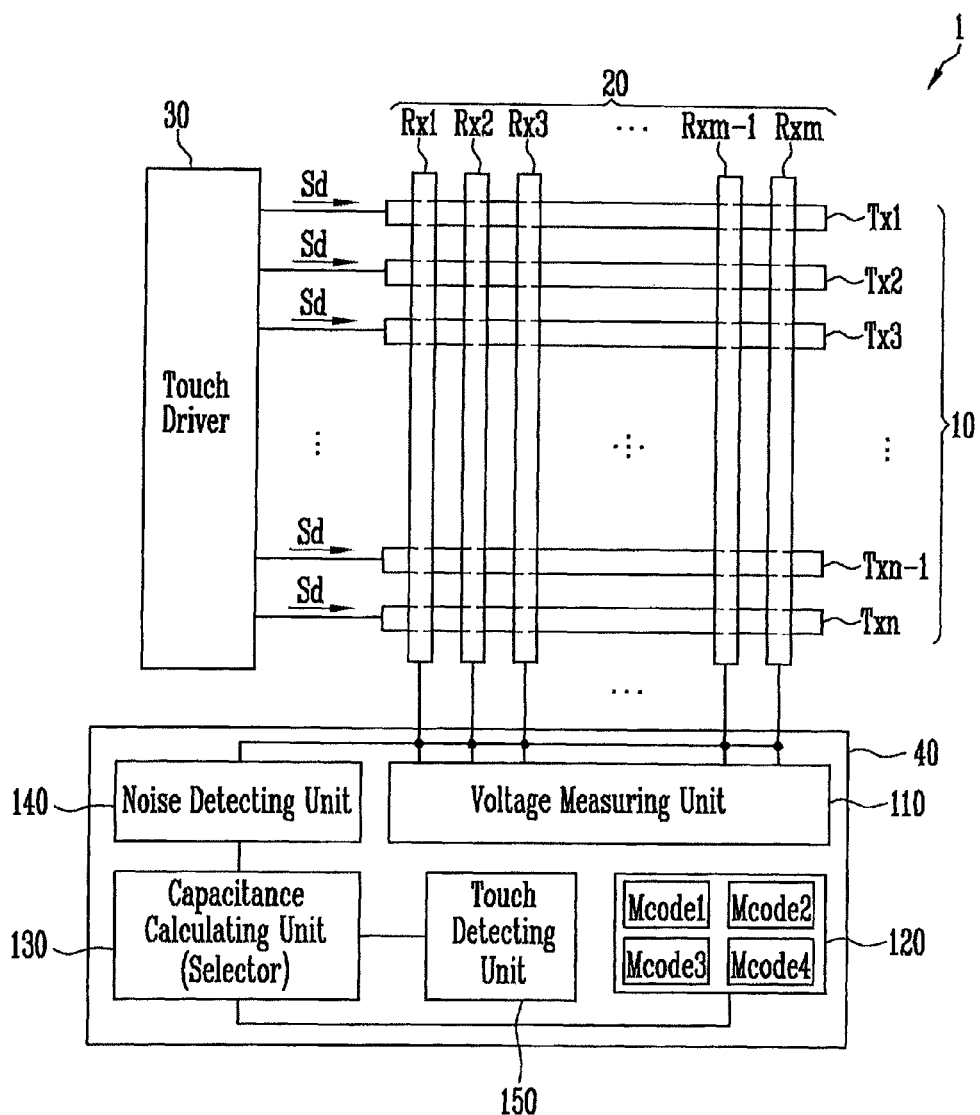
FIG. 2 illustrates an embodiment of a controller of the touch sensor.
Figure 3:
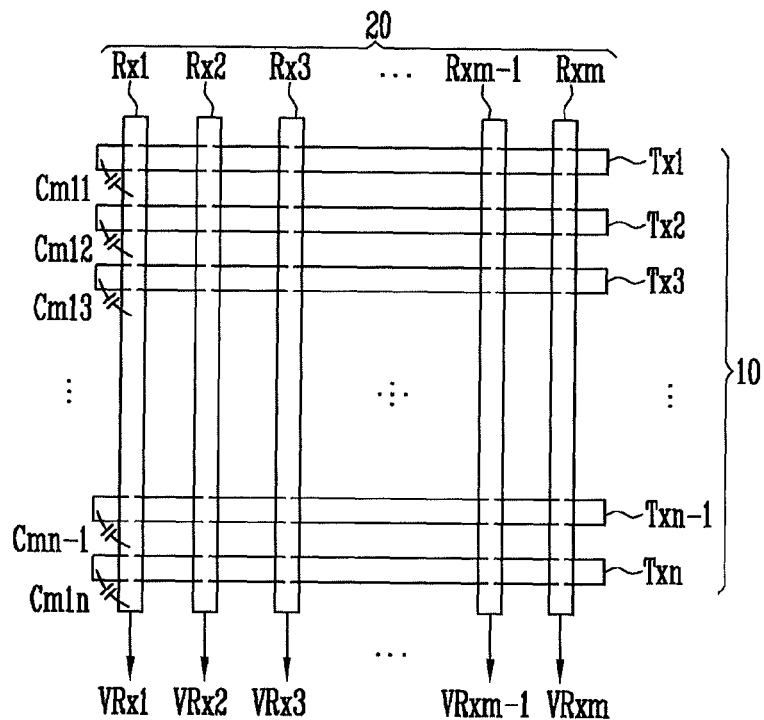
FIG. 3 illustrates examples of driving and sensing electrodes in FIG. 1.

FIG. 2 illustrates an embodiment of controller 40 of the touch sensor 1, and FIG. 3 illustrates examples of the driving and sensing electrodes 10 and 20 in FIG. 1. Referring to FIG. 2, controller 40 includes a voltage measuring unit 110, a memory 120 and a capacitance calculating unit 130. The voltage measuring unit 110 measures voltages VRx1 to VRxm from sensing electrodes 20. For example, voltage measuring unit 110 measures an output voltage VRx(t) for each time period of each sensing electrode 20. The voltage measuring unit 110 may be referred to as a voltage analyzer.

The output voltage VRx1 the first sensing electrode Rx1 may be measured for each time period T1, T2, . . . , or Tn. Therefore, output voltage VRx1 of first sensing electrode Rx1 at time t1 may be represented as VRx1(t1), and output voltage VRx1 of first sensing electrode Rx1 at time to may be represented as VRx(tn). The output voltages VRx2 to VRxm of the other sensing electrodes Rx2 to Rxm may be measured for each time period.

The memory 120 may store a plurality of code matrices Mcode. For example, memory 120 may store four code matrices Mcode1 to Mcode4. Code matrix Mcode may be an n×n matrix, e.g., one including n rows and n columns.

The capacitance calculating unit 130 (calculator) may calculate capacitance Cm between the sensing electrodes 20 and driving electrodes 10 based on a code matrix Mcode stored in memory 120 and an output voltage VRx of the sensing electrodes 20. For example, the capacitance calculating unit 130 may receive information from one of the code matrices Mcode in memory 120, select one of the code matrices in the memory 120, and calculate capacitance Cm between one of the sensing electrodes and one of the driving electrodes based on the selected one of the code matrices and a voltage matrix. The voltage matrix may include or may be based on the output voltages VRx(t) of one of the sensing electrodes 20 for each time period.

The voltage matrix My including output voltages VRx(t) of a specific sensing electrode 20 for each time period may be represented as the following n×1 matrix.

$$\begin{bmatrix} VRx(T1) \\ VRx(T2) \\ \vdots \\ VRx(Tn) \end{bmatrix}$$

For example, the voltage matrix Mv1 including output voltages VRx1(t) of the first sensing electrode Rx1 for each time period may be as the following matrix.

$$\begin{bmatrix} VRx1(T1) \\ VRx1(T2) \\ \vdots \\ VRx1(Tn) \end{bmatrix}$$

The code matrix Mcode may be represented as the following n×n matrix.

$$\begin{bmatrix} C1,1 & C1,2 & \ldots & C1,n \\ C2,1 & C2,2 & \ldots & C2,n \\ \vdots & & & \\ Cn,1 & Cn,2 & \ldots & Cn,n \end{bmatrix}$$

Each capacitance corresponds to an intersection (or crossing) point of respective driving and sensing electrodes. The mutual capacitance between a specific sensing electrode and a plurality of driving electrodes 10 may be expressed by the following n×1 matrix Mcm.

$$\begin{bmatrix} Cm1 \\ Cm2 \\ \vdots \\ Cmn \end{bmatrix}$$

In the above matrix, capacitance Cm1 corresponds to a capacitance between the specific sensing electrode and first driving electrode Tx1, capacitance Cm2 corresponds to a capacitance between the specific sensing electrode and second driving electrode Tx2, and capacitance Cmn corresponds to a capacitance between the specific sensing electrode and n-th driving electrode Txn. For example, capacitances Cm11 to Cm1n may respectively exist at portions where the first sensing electrode Rx1 intersects the first to n-th driving electrodes Tx1 to Txn.

Therefore, the capacitances between the first sensing electrodes Rx1 and plurality of driving electrodes 10 may be expressed by the following n×1 matrix Mcm1.

$$\begin{bmatrix} Cm11 \\ Cm12 \\ \vdots \\ Cm1n \end{bmatrix}$$

The capacitances between the other sensing electrodes Rx2 to Rxm and driving electrode 10 may be represented as the matrix described above.

In this case, the voltage matrix Mv including the output voltage VRx(t) of a specific electrode for each time period, the code matrix Mcode, and the matrix Mcm including the capacitance between the specific sensing electrode and driving electrode may satisfy the following expression.

$$Mv = Mcode \times Mcm \qquad (1)$$

Expression 1 may be modified as follows.

$$Mcm = Mcode^{-1} \times Mv \qquad (2)$$

Thus, the capacitance between the sensing and driving electrodes may be calculated based on a multiplication of the inverse matrix of the code matrix Mcode selected by capacitance calculating unit 130 and the voltage matrix Mv.

For example, capacitances Cm11 to Cm1n between first sensing electrode Rx1 and corresponding driving electrodes 10 may be calculated as:

$$Mcm1 = Mcode^{-1} \times Mv1 \qquad (3)$$

In this case, Expression 3 may be represented as follows:

$$\begin{bmatrix} Cm11 \\ Cm12 \\ \vdots \\ Cm1n \end{bmatrix} = \begin{bmatrix} C1,1 & C1,2 & \ldots & C1,n \\ C2,1 & C2,2 & \ldots & C2,n \\ \vdots & & & \\ Cn,1 & Cn,2 & \ldots & Cn,n \end{bmatrix}^{-1} \times \begin{bmatrix} VRx1(T1) \\ VRx1(T2) \\ \vdots \\ VRx1(Tn) \end{bmatrix} \qquad (4)$$

Capacitance calculating unit 130 may calculate capacitances Cm11 to Cm1n of first sensing electrode Rx1 using Expression 4. The capacitances of sensing electrodes Rx2 to Rxm may also be calculated using the method described above.

The controller 40 may further include a touch detecting unit 150 to detect a touch position based on the capacitance calculated by capacitance calculating unit 130. The touch detecting unit 150 may detect the touch position by recognizing a change in capacitance.

For example, when capacitance Cm12 among capacitances Cm11 to Cm1n calculated in Expression 4 has a value lower than the other capacitances or has a value lower than a reference value, touch detecting unit 150 may recognize that a touch has occurred at the intersection point of first sensing electrode Rx1 and second driving electrode Tx2.

The capacitance calculating unit 130 may change the code matrix Mcode that has been selected into another code matrix. For example, after using a first code matrix Mcode1 in memory 120 during a specific period, capacitance calculating unit 130 may select and use a second code matrix Mcode2 different from the first code matrix Mcode1, rather than the first code matrix Mcode1. In this case, the capacitance calculating unit 130 may select any one among the plurality of code matrices Mcode stored in memory 120, based on noise existing in sensing electrode 20.

To this end, controller 40 may include a noise detecting unit 140 to measure noise in at least one sensing electrode 20. For example, noise detecting unit 140 may detect the frequency of noise in at least one of the sensing electrodes 20 and may provide the detected frequency to capacitance calculating unit 130. The capacitance calculating unit 130 may select a code matrix Mcode from memory 120 that corresponds to the frequency of the noise measured by noise detecting unit 140.

In one embodiment, a look-up table which defines a correspondence between the frequencies of noise and one or more respective code matrices may be stored in memory 120. Thus, the code matrix for calculating the capacitance of a touch electrode may be changed, to thereby reduce the influence of noise and increase the accuracy of touch recognition.

Figure 4:
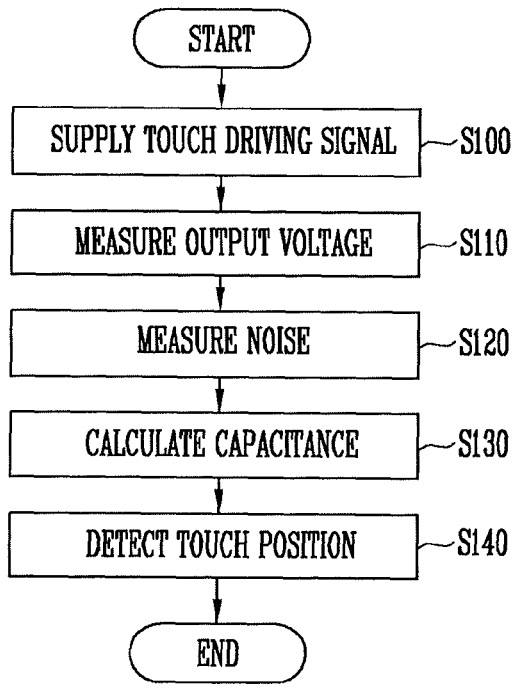
FIG. 4 illustrates an embodiment of a method for driving a touch sensor.

FIG. 4 illustrates an embodiment of a method for driving a touch sensor, which, for example, may be the touch sensor in FIG. 1. Referring to FIG. 4, the method includes supplying a touch driving signal (S100), measuring an output voltage (S110), and calculating capacitance (S130). The method may optionally include measuring noise (S120) and/or detecting a touch position (S140).

In supplying the touch driving signal (S100), a touch driving signal Sd may be supplied to the driving electrode 10. Touch driver 30 may progressively supply the touch driving signal Sd to driving electrodes 10, or may simultaneously supply the touch driving signal Sd to at least two of the driving electrodes 10.

In measuring the output voltage (S110), output voltages of the sensing electrodes 20 for each time period one may be measured. The voltage measuring unit 110 may measure an output voltage VRx(t) for each time period of each sensing electrode 20.

In calculating the capacitance (S130), any one of the code matrices Mcode stored in memory 120 may be selected. The capacitance between the sensing electrodes 20 and driving electrodes 10 may be calculated based on a voltage matrix, which includes or is based on the output voltages of one of the sensing electrodes 20 for each time period.

The capacitance calculating unit 130 may select any one of the code matrices Mcode in memory 120, and may calculate capacitance Cm between the one of the sensing electrodes and one of the driving electrodes based on the selected one of the code matrices and a voltage matrix, which includes or is based output voltages VRx(t) of one of the sensing electrodes 20 for each time period.

In calculating of the capacitance (S130), any one of the code matrices stored in memory 120 may be selected based on noise in at least one sensing electrode 20. To this end, the method may include measuring noise (S120). Measuring noise includes measuring noise in at least one sensing electrode 20. For example, the frequency of noise in a respective sensing electrode 20 may be detected to measure noise.

In calculating capacitance (S130), a code matrix Mcode corresponding to the frequency of the measured noise may be selected from memory 120. To this end, the noise detecting unit 140 may measure noise in at least one sensing electrode 20.

The method according to this embodiment may further include detecting a touch position (S140). In detecting touch position (S140), a touch position input to touch sensor 1 may be detected based on the capacitance calculated in operation S130. To this end, touch detecting unit 150 may detect the touch of a user by recognizing a change in capacitance.

By way of summation and review, one or more of the aforementioned embodiments provide a touch sensor and associated driving method which change a code matrix for calculating capacitance in a manner which reduces adverse effects of noise and improves touch recognition accuracy.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A touch sensor, comprising:
   a plurality of driving electrodes;
   a plurality of sensing electrodes crossing the driving electrodes;
   a touch driver to supply a touch driving signal to the driving electrodes;
   a voltage measuring unit to measure output voltages of the sensing electrodes for each time period;
   a noise detecting unit to detect a frequency of noise in at least one of the sensing electrodes;
   a memory to store a plurality of code matrices; and
   a capacitance calculating unit to select one matrix of the code matrices in the memory according to the detected frequency of the noise of the at least one of the sensing electrodes, and to calculate a capacitance between the at least one of the sensing electrodes and at least one of the driving electrodes using the selected one matrix of the code matrices and a voltage matrix, wherein
   the voltage matrix includes a measured output voltage corresponding to the at least one of the sensing electrodes.

2. The touch sensor as claimed in claim 1, wherein the capacitance calculating unit is to change the selected one of the code matrices to another one of the code matrices when the detected frequency of the noise is changed.

3. The touch sensor as claimed in claim 1, wherein the capacitance calculating unit selects a code matrix corresponding to the detected frequency of the noise of the at least one of the sensing electrodes from the plurality of code matrices based on a look-up table that defines a correspondence between frequencies of noises in the sensing electrodes and the plurality of code matrices.

4. The touch sensor as claimed in claim 1, further comprising:
   a touch detecting unit to detect a touch position based on the capacitance calculated by the capacitance calculating unit.

5. The touch sensor as claimed in claim 1, wherein the capacitance calculating unit calculates the capacitance between the at least one of the sensing electrodes and the at least one of the driving electrodes using a product of an inverse matrix of the selected one matrix of the code matrices and the voltage matrix.

6. The touch sensor as claimed in claim 1, wherein the driving electrodes and sensing electrodes are transparent electrodes.

7. A method of driving a touch sensor, the method comprising:
   supplying a touch driving signal to a plurality of driving electrodes;
   measuring output voltages of a plurality of sensing electrodes for each time period;
   detecting a frequency of noise in at least one of the sensing electrodes; and
   selecting one matrix of a plurality of code matrices according to the detected frequency of the noise of the at least one of the sensing electrodes and calculating capacitances between the sensing electrodes and the driving electrodes using the selected one matrix of the code matrices and a voltage matrix, wherein
   the voltage matrix includes the measured output voltages of the sensing electrodes.

8. The method as claimed in claim 7, wherein calculating the capacitances between the sensing electrodes and driving electrodes includes selecting a code matrix corresponding to the detected frequency of the noise of the at least one of the sensing electrodes from the plurality of code matrices based on a look-up table that defines a correspondence between frequencies of noises in the sensing electrodes and the plurality of code matrices.

9. The method as claimed in claim 7, further comprising detecting a touch position based on the calculated capacitances.

10. The method as claimed in claim 7, wherein calculating the capacitance between the sensing and driving electrodes includes calculating the capacitances between the sensing electrodes and driving electrodes using a product of an inverse matrix of the selected one matrix of the code matrices and the voltage matrix.

11. The method as claimed in claim 7, wherein the driving electrodes and sensing electrodes cross each other.

12. The method as claimed in claim 7, wherein the driving electrode and sensing electrode are transparent electrodes.

13. A controller, comprising:
   a voltage analyzer to measure output voltages of a plurality of sensing electrodes of a touch sensor;
   a selector to select one matrix of a plurality of code matrices according to a frequency of noise in at least one of the sensing electrodes; and
   a calculator to calculate capacitances between the sensing electrodes and a plurality of driving electrodes of the touch sensor using the selected one matrix of the plurality of code matrices and a voltage matrix, wherein
   the voltage matrix includes the measured output voltages of the sensing electrodes.

14. The controller as claimed in claim 13, wherein the selected one matrix of the code matrices corresponds to the detected frequency of the noise in at least one of the sensing electrodes.

15. The controller as claimed in claim 14, further comprising:
   a touch detector to detect a touch position based on the capacitances calculated by the calculator, wherein
   the touch position based on the capacitances calculated based on the selected one of the code matrices is more accurate than a touch position based on capacitances calculated based on another one of the code matrices that does not correspond to the detected frequency of the noise.

\* \* \* \* \*